H. KAPLAN.
EXPANDING TOOL FOR WHEEL RIMS.
APPLICATION FILED MAR. 9, 1915. RENEWED MAY 17, 1916.
1,214,315.
Patented Jan. 30, 1917.
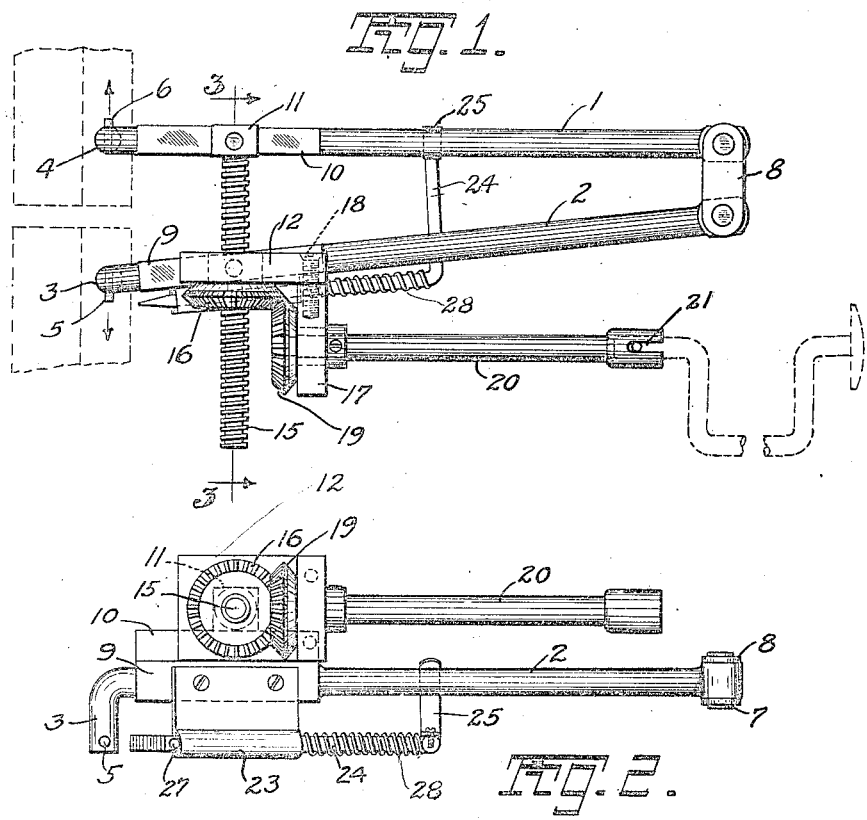
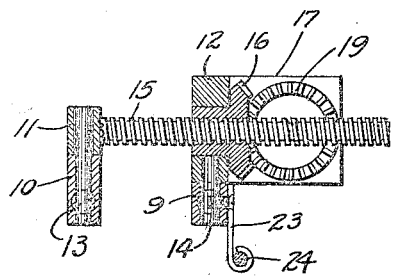
WITNESSES:
INVENTOR.
H. KAPLAN.
BY
Carlos P Griffin
ATTORNEY.

UNITED STATES PATENT OFFICE.

HENRY KAPLAN, OF SAN FRANCISCO, CALIFORNIA, ASSIGNOR TO LONG MANUFACTURING COMPANY, OF SAN FRANCISCO, CALIFORNIA, A CORPORATION OF CALIFORNIA.

EXPANDING-TOOL FOR WHEEL-RIMS.

1,214,315.   Specification of Letters Patent.   Patented Jan. 30, 1917.

Application filed March 9, 1915, Serial No. 13,261. Renewed May 17, 1916. Serial No. 98,310.

*To all whom it may concern:*

Be it known that I, HENRY KAPLAN, a citizen of the United States, residing at San Francisco, in the county of San Francisco, State of California, have invented a new and useful Expanding-Tool for Wheel-Rims, of which the following is a specification, in such full and clear terms as will enable those skilled in the art to construct and use the same.

This invention relates to a tool for removing tires and tire rim securing rings from the wheel to which they are attached.

An object of the invention is to produce a tool having sufficient strength to draw up the ring or to expand the same under the disadvantageous conditions of practical use.

It will be understood by those skilled in the art that while many devices look as if they would work satisfactorily and do work satisfactorily when clean that after being rusted in place on a wheel for a considerable length of time they are very difficult to operate. This invention therefore seeks to provide a device which will overcome these defects and be capable of satisfactory service under the hardest usage.

An embodiment of the invention is shown in the drawing in which the same reference numeral is applied to the same portion throughout, but I am aware that there are many modifications thereof within the scope of the appended claims.

Figure 1 is a plan view of the tool, the dotted lines indicating the manner of applying the same to the tire ring and also illustrating a tool for turning its drive shaft, Fig. 2 is a side elevation of the complete tool, and Fig. 3 is a view in vertical section showing the construction of the tool on the line 3—3, Fig. 1.

The numerals 1 and 2 indicate two arms having downturned ends 3 and 4 each of which has a projecting pin as shown at 5 and 6. At the other ends the two arms are pivotally connected together by means of two short links 7 and 8. The arms have enlarged portions at 9 and 10 on which two blocks 11 and 12 are pivotally mounted, pins extending therefrom through the arm as shown at 13 and 14.

The block 11 has a screw 15 rigidly connected thereto which extends through a bevel gear nut 16 revolubly mounted in the block 12. Connected with the block 12 is a block 17 secured to the block 12 by means of a screw 18. Said block extends at a right angle to the block 12 and forms a bearing for a bevel gear 19 on the end of the rod 20, said gear being in mesh with the gear 16. The rod 20 has a socket 21 on its end to enable it to be rotated by means of any suitable tool.

At the side of the part 9 a plate 23 is secured, said plate having its lower portion turned to form a slide for a rod 24, which rod has one end chisel shaped to open a lock on the wheel rim. The other end of the rod has a spring clamp 25 thereon to gage the spacing of the jaws of the tool, and a spiral spring 26 is mounted thereon to secure it in the position indicated in Fig. 1, a pin 27 striking the plate 23 and preventing the bar 24 from being withdrawn from the plate 23 in which it is slidable.

The operation of the apparatus is as follows: With the arms 1 and 2 as close together as it is possible to draw them, the points 3 and 4 are inserted in holes in the tire or rim locking ring to be spread apart. The wedge shaped end of the rod 24 is then inserted in a lock carried by the ring, which lock forms no part of the present invention, to hold it open, while the bevel gear 16 is rotated to separate the ends of the ring. The position of the clamp 25 is so arranged with respect to the rod 2 that the ring will be sufficiently opened when the rod 1 is in a position to pass into the clamp, whereupon the ring may be removed from the wheel or rim, as the case may be.

Having thus described my invention what I claim as new and desire to secure by Letters Patent of the United States, is as follows, modifications within the scope of the claims being expressly reserved:

1. An expanding tool for wheel rims comprising a pair of arms pivoted together, a screw pivotally connected with one of said arms and extending through a nut bearing on a block pivotally connected with the other arm, and a sliding bar for opening a lock on the wheel rim and supported by one of said arms.

2. An expanding tool for wheel rims comprising a pair of arms pivoted together, a screw pivoted to one of said arms and extending through a bevel gear nut bearing on a block pivoted to the other arm, a second bevel gear in mesh with the first bevel gear, and manual means for rotating said gears and expanding or contracting the tool.

3. An expanding tool for wheel rims comprising a pair of arms pivoted together, a screw pivotally connected with one of said arms, a nut through which said screw extends, a pivoted block on the other arm against which said nut bears, and a rod supported adjacent one of said arms and having a clamp to engage one of the arms on one end thereof and having the other end shaped for disengaging the lock on a wheel rim.

In testimony whereof I have hereunto set my hand this 25th day of February, 1915, in the presence of a witness.

HENRY KAPLAN.

Witness:
   HENRY B. LISTER.